Dec. 31, 1929.    M. C. RECK    1,741,791
COOKING STOVE
Filed June 24, 1926    3 Sheets-Sheet 1
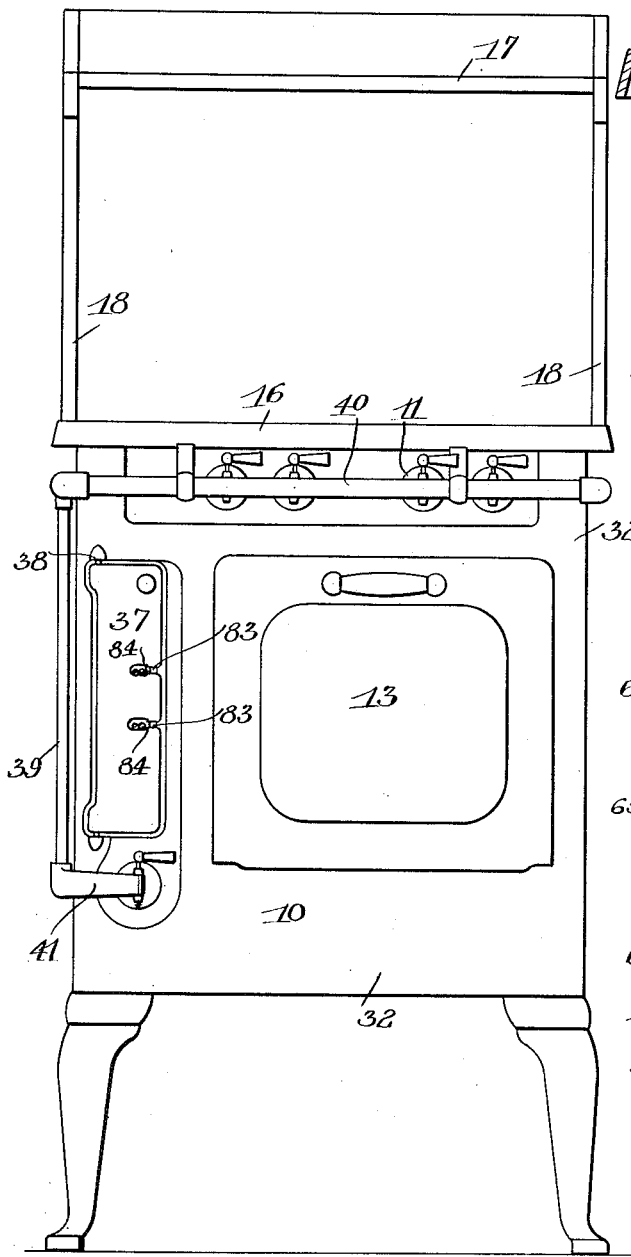
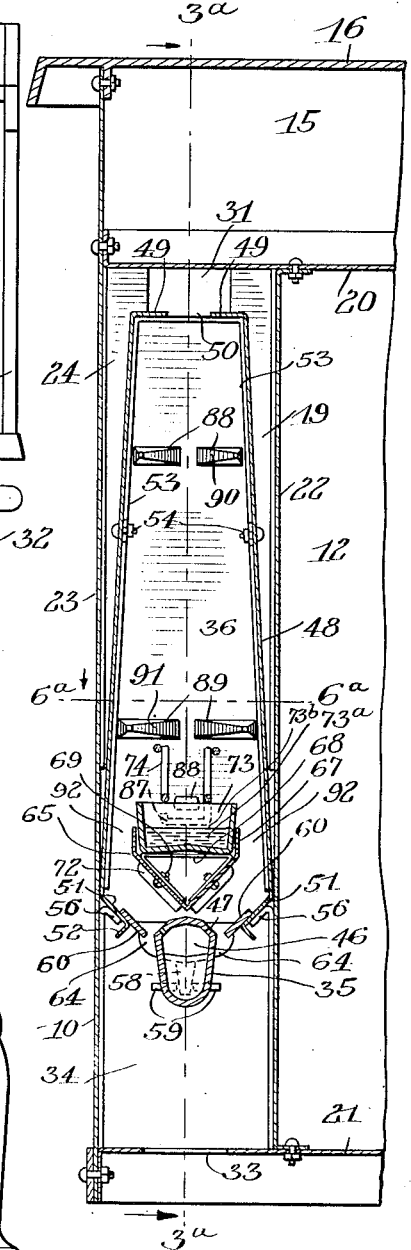
INVENTOR
Maurus C. Reck
BY
his ATTORNEYS

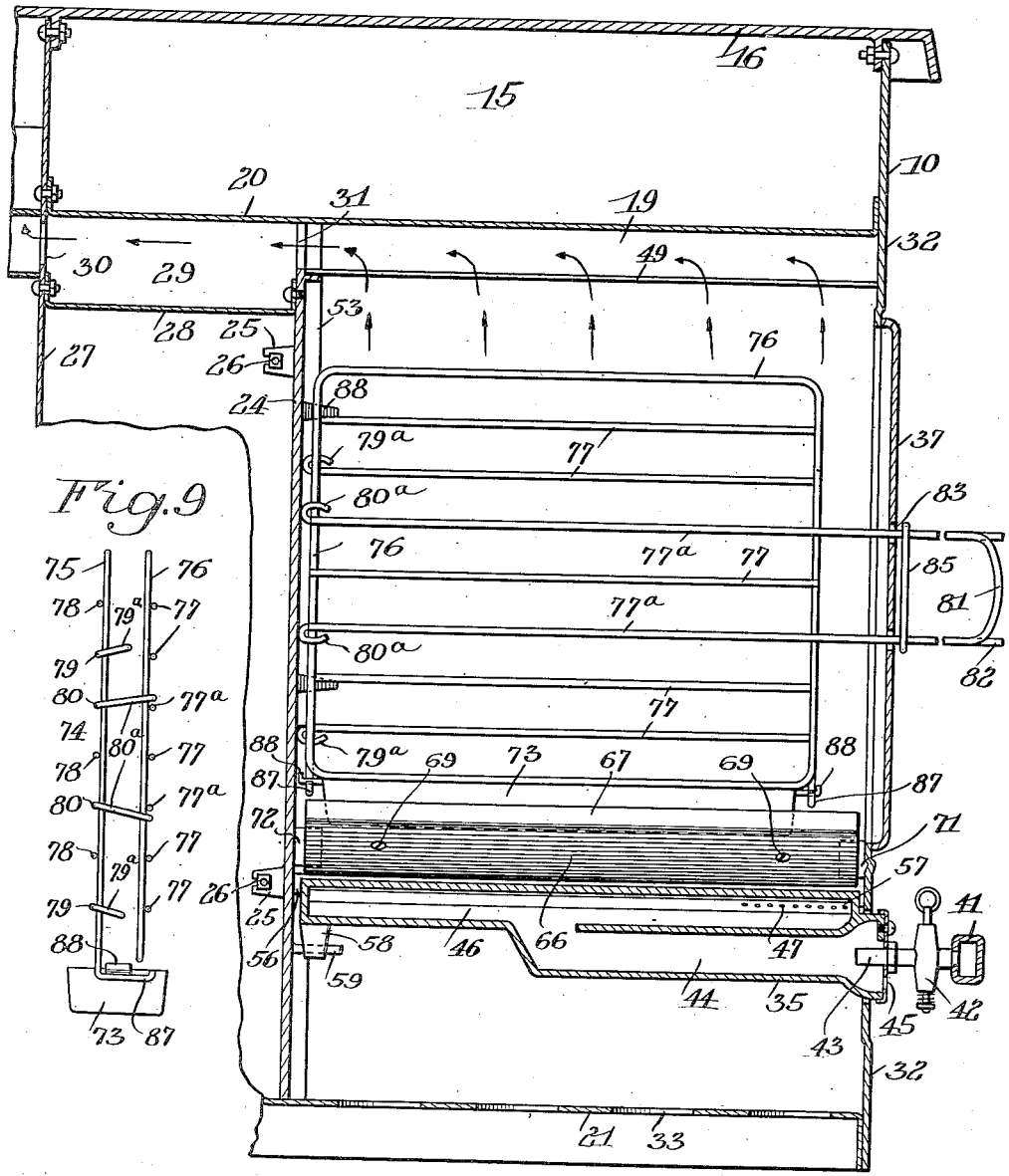

Dec. 31, 1929.  M. C. RECK  1,741,791
COOKING STOVE
Filed June 24, 1926    3 Sheets-Sheet 3
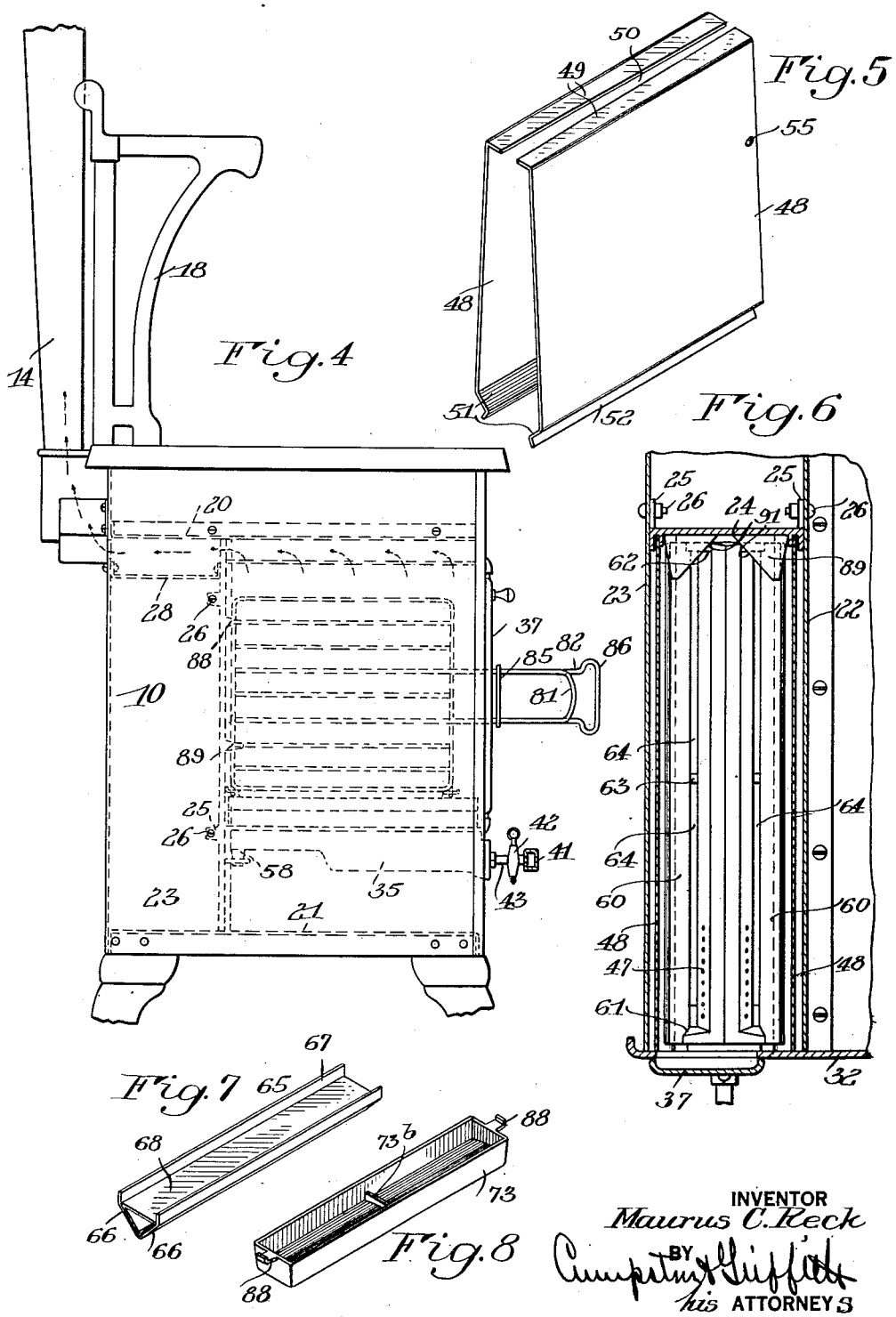
INVENTOR
Maurus C. Reck
BY
his ATTORNEYS Patented Dec. 31, 1929

1,741,791

UNITED STATES PATENT OFFICE

MAURUS C. RECK, OF ROCHESTER, NEW YORK, ASSIGNOR TO STERLING RANGE AND FURNACE CORPORATION, A CORPORATION OF NEW YORK

COOKING STOVE

Application filed June 24, 1926. Serial No. 118,154.

The present invention relates to a cooking stove and has for its object to provide more particularly an improved oven construction designed to effect economy in the use of gas and to uniformly cook or broil meats and other foods in a minimum amount of time.

A further object of the invention is to provide an improved broiling chamber and burner construction together with means by which the products of combustion are so controlled as to simultaneously and uniformly cook or broil both sides of steaks and the like suspended or otherwise supported within the oven.

A further object of the invention is to provide an improved oven or broiling compartment having means for centering and holding a cooking utensil or grid in a vertical position therein and in spaced relation to the side walls thereof.

Still another object of the invention is to provide an improved grid for holding meat portions of different thicknesses in an upright position within a broiling oven in combination with a drip pan connected with the grid to form a unitary cooking utensil which can be readily inserted within and removed from the oven.

To these and other ends the invention resides in certain improvements and combinations of parts, all as will be hereinafter more fully described, the novel features being pointed out in the claims at the end of the specification.

In the drawings:

Fig. 1 is a front elevation of a stove embodying the invention;

Fig. 2 is an enlarged fragmentary sectional elevation taken transversely of the broiling compartment shown at the left of the stove as viewed in Fig. 1;

Fig. 3 is a fragmentary sectional elevation taken on line 3ª—3ª of Fig. 2;

Fig. 4 is a side elevation of the stove as viewed from the left of Fig. 1;

Fig. 5 is a perspective view showing the relation of the converging side walls of the broiling compartment;

Fig. 6 is a fragmentary sectional plan taken on line 6ª—6ª of Fig. 2;

Fig. 7 is a detailed perspective view of the flame spreader shown above the burner in Fig. 2;

Fig. 8 is a detailed perspective view of a drip pan superimposed upon the spreader;

Fig. 9 is an end elevation of a grid or cooking utensil with which the drip pan is connected; and Figs. 10 and 11 are fragmentary sections taken transversely of the grid showing it adjusted to accommodate food portions of different thicknesses.

In the present embodiment of the invention I have shown my improved oven construction in conjunction with a cooking stove or gas range having the usual baking compartment and burner arrangement at the top of the stove, but it will be understood that the invention may be embodied in a separate unit distinct from the ordinary gas range.

Referring to the drawings, 10 represents a cooking stove or gas range of a well-known type having the usual burner arrangement 11 at the top thereof and an oven 12 beneath the same with a door or closure 13 as shown in Fig. 1. The stove is provided with a flue 14 for carrying off the products of combustion from the oven 12 and the several burners 11 which discharge into the combustion chamber or burner box 15 beneath the top 16 of the stove on which the various cooking utensils are supported. The stove preferably includes a warming shelf 17 supported above the top 16 by the side arms 18 in the usual manner.

Located at one side of the oven 12, preferably at the left side is a relatively narrow compartment 19 formed by an extension of the upper and lower walls 20 and 21 respectively of the oven 12 and the side wall 22 of the latter together with the side wall 23 of the stove, all as shown in Fig. 2. The back wall of the compartment 19 is preferably in the form of a casting as indicated at 24 in Figs. 3 and 6. The casting is provided with rearwardly extending lugs 25 which are connected to the walls 22 and 23 by bolts 26. The casting 24 is connected adjacent its upper end with the rear wall 27 of the stove by a plate 28 forming the bottom of a horizontal flue 29 adapted to discharge into the flue 14 through an opening 30 in the rear wall 27 as shown in Fig. 3. The upper end of the compartment 19 connects with the flue 29 through an opening 31 in the top of the casting 24. The front wall 32 of the stove is extended to form the front of the compartment 19. The bottom wall 21 beneath the compartment 19 is provided with a number of openings 33 leading to an air chamber 34 from which secondary air is supplied to a burner 35 in a manner which will be subsequently explained. The burner is located at the bottom of an oven or broiling chamber 36 in which different kinds of meats or other foods may be cooked or broiled while supported vertically within the chamber by means which will be presently described. The oven chamber 36 is provided with a door 37 hinged at 38 to swing outwardly toward the left side of the stove as viewed in Fig. 1. Gas is supplied to the burner 35 by a pipe 39 depending from the main supply pipe 40 for delivering gas to the burners 11. The pipe 39 has an inwardly extending portion 41 which carries a valve 42 for regulating the supply of gas to the burner 35. The valve is provided with a nozzle 43 adapted to discharge into a preliminary mixing chamber 44 of the burner to which primary air is admitted through openings 45 in the front of the burner. The preliminary mixing chamber 44 extends longitudinally beneath the main mixing chamber 46 of the burner and preferably discharges into the latter at a point substantially midway between the ends of the burner whereby to more evenly distribute the gas to all parts of said chamber from which it is discharged through ports 47 which extend in separate rows for the entire length of the burner but of which only a limited number are shown. The ports are so arranged as to direct the flames outwardly and upwardly toward the sides of the cooking or broiling chamber 36. This chamber is relatively wide at its base and narrow at its upper ends for purposes which will be subsequently explained. The rear wall of the chamber is formed by the casting 24 and the front wall by the plate 32 and the door 37 while the sides are formed by the upwardly extending and inwardly converging plates 48. These plates or side walls are provided at their upper ends with inwardly extending tapered flanges 49 which converge as shown in Fig. 5 to form a tapering outlet passage 50 for the discharge of the gas from the cooking chamber into the top of the compartment 19, from which it discharges to the flue 14 through the horizontal flue 29 and opening 31 as shown in Fig. 3.

The lower edges of the converging side walls are provided with inwardly extending portions 51 which project toward and are inclined with respect to the burner, said portions being turned outwardly at 52 to form stiffening flanges as shown in Figs. 2 and 3.

The side plates 48 rest at their rear ends upon the inwardly projecting flanges or ribs 53 on the rear wall 24 of the chamber 36 and are suitably held by the bolts 54 which project through the flanges and through openings 55 in the plates 48 one of which is shown in Fig. 5. The side plates are further supported by disposing the rear ends of the inwardly turned flanges 51 upon the inclined lugs 56 which project from the casting 24 as shown in Figs. 2 and 3. The front ends of the inwardly extending flanges 51 are supported by lugs 57 projecting inwardly from the front wall 32 of the stove, one of these lugs being indicated in Fig. 3.

The rear end of the burner 35 is provided with a depending tapered lug 58 extending between and supported by a pair of lugs 59 projecting inwardly from the rear wall 24 of the broiling chamber. The burner is provided at its opposite sides with upwardly inclined plate portions 60 which rest upon and are supported by the inwardly turned flanges 51 of the side walls 48 as shown in Fig. 2. The plate portions 60 are preferably cast integral with the burners at the front and rear ends thereof as indicated respectively at 61 and 62 and also at the center of the burner as shown in 63 in Fig. 6. The plate portions 60 are so disposed as to form with the burner relatively narrow passages 64 along its sides, below and adjacent to the discharge ports 47 of the burner so as to permit secondary air to be supplied to the base of the flame. By reason of the construction shown the secondary air discharging through the passage 64 flows in a direction transverse to the flame at a point near the base thereof and becomes thoroughly mixed with the outflowing burner gases. This distribution of the air and gases serves to better promote combustion and produces an extremely hot flame so that the time required for broiling or cooking meats or other foods is reduced to a minimum.

Disposed immediately over the burner 35 is a baffle or flame spreader 65 of V-shaped construction, the converging sides 66 of which terminate in vertically disposed extensions 67. Located within the flame spreader is a triangular shaped tie member 68 connecting the sides of the spreader and secured thereto by bolts 69 as shown in Fig. 2. The spreader is supported at its front and rear ends by lugs 71 and 72 respectively which project from the front and rear walls 32 and 24 of the cooking chamber 36. The tie member 68 forms a support for a drip pan 73 which is connected with and disposed immediately below a grid or cooking utensil 74. The latter is centrally and vertically disposed within the cooking chamber 36 in spaced relation to the side walls thereof. The grid may be supported within the chamber by any suitable means but is preferably arranged to rest upon the drip pan when in service position as indicated in Fig. 2. The grid embodies two adjustable sections 75 and 76, each preferably comprising a wire frame of rectangular construction. The frames 75 and 76 include respectively a number of longitudinally extending wires or rods 77 and 78 welded or otherwise connected to the border wires of the frames. The frame 75 carries two wires 79 having relatively short angularly disposed hooks 79ª at their rear ends for engaging the rear border wire of the frame 76 as shown in Fig. 11 whereby the two sections will be brought comparatively close together to accommodate relatively thin steaks, chops and the like. The frame 75 is also provided with two wires 80 which carry at their rear ends angularly disposed hooks 80ª which are longer than the hooks 79ª and which are adapted to engage the rear border wire of the frame 76 as shown in Fig. 10 whereby the grid will accommodate relatively thick steaks or other meat portions. The wires 77ª of the frame section 76 are extended from the body of the grid to form a handle portion 81 while the wires 80 of the frame section 75 are extended to form a handle portion 82 somewhat longer than the handle portion 81. The handle portions project through the upper and lower transversely extending slots 83 in the door 37, the slots being reduced at their outer ends to form shoulder portions 84 against which the handle portion 82 is adapted to rest as shown in Fig. 1 whereby to prevent accidental shifting of the grid from central position within the broiling chamber. The handle portions 81 and 82 are clamped together at a point adjacent to the door 37 by a bail 85 which is slidable upon said portions and movable outwardly to release the handle portion 81 so that the frame sections may be opened by swinging one upon the other when it is desired to remove the meat or other food portions clamped therebetween. The outer end of the handle portion 82 is enlarged as indicated at 86 to prevent loss or removal of the bail 85 which, as will be understood serves to clamp the frames upon the food portions held therebetween.

The drip pan 73 is placed directly beneath the broiler and is made somewhat wider than the latter so as to catch all of the drippings from the meat, which can be preserved or disposed of as desired, it being understood that the pan and the grid are removable as a unit. The pan is supported by the grid, when removed from the broiling chamber, by the transversely extending hooks or arms 87 on the frame section 75, the arms extending beneath lugs 88 which project from the ends of the drip pan as shown in Figs. 3 and 9. The lugs are made wide enough to steady and prevent overturning of the pan when the grid is withdrawn from the broiling chamber. The pan can be readily detached from the grid by sliding it to move the lugs outwardly upon the arms 87 beneath the bottom of the frame section 76.

The bottom of the drip pan is raised slightly at the center as shown in Fig. 2 to cause the drippings or liquid therein to collect at the opposite sides of the pan whereby to protect it against burning at these points which become extremely hot by reason of their close proximity to the flames of the burner.

To insure proper positioning of the grid in the chamber 36 when moved to service position therein, two sets of inwardly projecting lugs 88 and 89 are carried by the rear wall 24 of the broiler chamber, said lugs having oppositely disposed inclined or converging sides 90 and 91 respectively for receiving the rear end of the grid to center and hold it in upright position within the chamber.

The grid handle which projects through the door 37 is held thereby so that the front end of the grid is also held centered within the broiler chamber.

The vertical extensions 67 of the baffle 65 serves as guides for centering the drip pan above the burner when the grid and pan are inserted within the broiling chamber and also protect the drip pan from the flames. The extensions lie relatively close to the side walls 48 of the chamber so as to form narrow passages 92 above the burner whereby the products of combustion are directed upwardly along the sides of the chamber to insure uniform cooking of both sides of the meat or other food portions held vertically and centrally within said chamber by the grid. The inclined or converging walls of the baffle together with the particular arrangement of burner ports shown serve to direct the gases outwardly and upwardly through the relatively narrow passages 92, thus further insuring upwardly moving columns of highly heated air on opposite sides of the meat portions, whereby the latter will be uniformly seared and cooked in a minimum amount of time. Uniform cooking of all parts of the food portions held by the grid is further insured by converging the side walls of the broiling chamber inwardly as shown. This results in gradually bringing the upwardly moving columns of heated air into closer proximity to said food portions which as before stated are held at the center of the chamber by the vertically disposed grid. It will be understood that the meat or other food is cooked by the heat from the ascending columns of gas and since the temperature of the gas decreases as it moves upwardly, it is necessary in order to compensate for the loss of heat to gradually reduce the cross-sectional area of the cooking chamber as shown whereby to maintain a uniform temperature therein. Thus, it will be seen that the food portions to be cooked are at all times surrounded by an envelope of heated air of substantially uniform temperature throughout.

The advantage of tapering the outlet passage 50 of the cooking chamber as shown in Fig. 5 is to equalize the flow of the gases from the chamber through said passage, or in other words, prevent too rapid an escape of the gases from the said chamber at any one point. Since all of the gases pass through the opening 31 located above and at the rear of the broiling chamber the tendency is for a more rapid movement of the gases to this point than to other points of the passage 50 due to the draft in the flues 14 and 19 which varies from time to time. This tendency is offset by gradually restricting the passage 50 toward the rear as shown, the effect being to prevent cross currents in the cooking chamber and to insure uniform discharge of the gas from all parts of said passage.

The radiation of heat from the cooking chamber is reduced to a maximum by an insulating body of air within the compartment 19 surrounding the chamber, particularly by reason of the fact that the air in said compartment is non-circulating and therefore more effective in preventing the escape of heat from the cooking chamber.

An important feature of the invention embodies the use of a burner at the bottom of a cooking or heating chamber beneath which is preferably provided an air receiving chamber having suitable air inlet openings, the object being to provide a relatively narrow air inlet passage leading from the air receiving to the heating or cooking chamber, the passage being preferably so disposed as to discharge the air upwardly in a direction transverse to the flame at a point adjacent the base thereof so that it will be thoroughly mixed with the outflowing burner gases. With this arrangement no cold air is admitted to the cooking chamber since the supply of air discharged upwardly from below the burner is preferably restricted to the quantity necessary to promote combustion. At any rate all of the air entering the cooking chamber will be preheated as can be readily seen from the burner construction shown in Fig. 2 wherein the air collected in the chamber 34 discharges in equal amounts through the passages 64.

The pan 73 not only serves as a receptacle for catching the drippings from the meat but is important from another standpoint, namely, as a container for water which is indicated at 73ª, the pan being provided with an upstanding plate 73ᵇ forming a gauge for indicating the height to which the pan should be filled when steaks or other meats are to be cooked within the broiling chamber. The evaporation of the water supplies moisture to the meat, which has been found advantageous, particularly in preventing it from drying out and in rendering it more palatable. Furthermore, the water prevents the drippings from catching fire and the moisture prevents the lower part of the meat, which is relatively close to the flames from cooking more rapidly than the upper part.

I claim as my invention:

1. A broiling oven for receiving and supporting a grid or the like, said oven comprising vertically disposed front, rear, and side walls and having an outlet for the products of combustion, the side walls having inwardly extending plates spaced apart to form a longitudinally extending opening, a burner extending longitudinally of said opening in spaced relation to the inner edges of said plates and cooperating therewith to form separate relatively narrow air passages at the opposite sides of the burner, the latter having gas discharge ports above said openings arranged to discharge gas transversely across the openings in close proximity thereto, means overlying the burner adapted to direct the burner gases upwardly in separate streams toward the side walls of the oven, and connected walls forming insulating air compartments at opposite sides of the oven, said walls extending below the oven to form a secondary air chamber beneath the burner.

2. A broiling oven for receiving and supporting a grid or the like, said oven comprising vertically disposed front, rear, and side walls and having an outlet for the products of combustion, the side walls being extended inwardly and forming plate portions spaced apart to afford a longitudinally extending opening, a longitudinally extending burner disposed within said opening in spaced relation to the inner edges of said plate portions and projecting above and below the same, an air warming chamber beneath said plate portions into which the lower portion of the burner projects, the latter serving as a baffle to direct the air upwardly in separate columns through said openings, the burner having gas discharge ports located above said openings and arranged to discharge gas transversely across the openings, means for removably supporting a grid vertically within the oven above the burner and means cooperating with the oven to afford insulating air spaces at the opposite sides thereof in communication with said outlet.

3. A broiling oven for receiving and supporting a grid or the like, said oven comprising vertically disposed front, rear, and side walls and having an outlet for the products of combustion, the side walls having inwardly extending plates spaced apart to form a longitudinally extending opening, a burner extending longitudinally of said opening in spaced relation to the inner edges of said plates and cooperating therewith to form separate relatively narrow air passages at the opposite sides of the burner, the latter having gas discharge ports above said openings arranged to discharge gas transversely across the openings in close proximity thereto, supporting means for the grid overlying the burner, means above the supporting means for holding the grid vertically thereon and means cooperating with the oven to afford insulating air spaces at the opposite sides thereof in communication with said outlet.

4. A broiling oven for receiving and supporting a grid or the like, said oven comprising vertically disposed front, rear, and side walls and having an outlet for the products of combustion, the side walls having inwardly extending plates spaced apart to form a longitudinally extending opening, a burner extending longitudinally of said opening in spaced relation to the inner edges of said plates and cooperating therewith to form separate relatively narrow air passages at the opposite sides of the burner, the latter having gas discharge ports above said opening arranged to discharge gas transversely across the openings in close proximity thereto, and means for holding the grid vertically over the burner comprising oppositely inclined members on the wall of the oven above the burner for receiving and guiding the grid to a normal service position.

5. A broiling oven for receiving and supporting a grid or the like, said oven comprising walls forming an air warming chamber and an oven chamber thereabove, the latter having a longitudinally tapering outlet passage for the discharge of the products of combustion and the former having an inlet passage for the air, plates extending inwardly from opposite walls of the oven between said chambers and having their inner edges spaced apart to form a longitudinally extending burner opening, a burner disposed within said opening and extending longitudinally thereof in spaced relation to said inner edges whereby to form relatively narrow openings for the passage of air from the lower to the upper chamber, said burner having gas discharge ports at its opposite sides arranged to direct the gas in separate streams transversely of said relatively narrow openings, and means for supporting the grid within the oven chamber.

6. A broiling oven for receiving and supporting a grid or the like, said oven comprising vertically disposed front, rear, and side walls and having an outlet for the products of combustion, the side walls having inwardly extending plates spaced apart to form a longitudinally extending opening, a burner extending longitudinally of said opening in spaced relation to the inner edges of said plates and cooperating therewith to form separate relatively narrow air passages at the opposite sides of the burner, the latter having gas discharge ports above said openings arranged to discharge gas transversely across the openings in close proximity thereto, a support overlying the burner within the oven, a drip pan carried by the support and having projecting lugs upon its ends, a grid detachably connected with the lugs arranged to project upwardly from the pan within the oven, said grid and pan being removable from the oven as a unit and means within the oven above said support for engaging and holding the grid in upright position.

MAURUS C. RECK.